3,142,973
DRIVING SHAFTS
Fraser Mackie Evans, Ickenham, Middlesex, and Kenneth Albert Walters Kemp, Ealing, Middlesex, England, assignors to C.A.V. Limited, London, England
Filed May 31, 1962, Ser. No. 199,160
Claims priority, application Great Britain June 1, 1961
1 Claim. (Cl. 64—27)

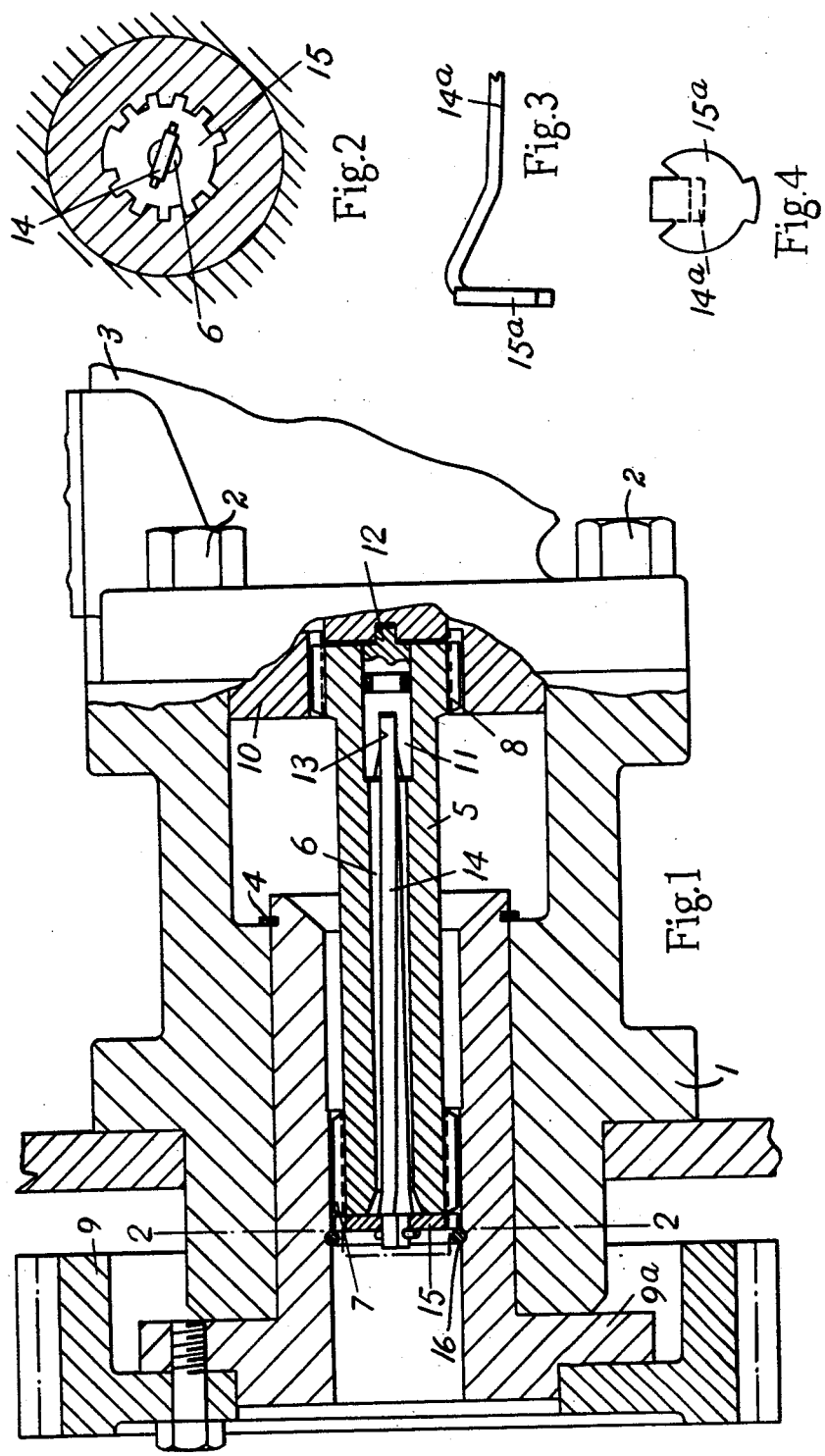

This invention relates to shafts for imparting a drive from a driving member to a driven member, and has for its object to provide a shaft whereby the effects of back lash can be minimised.

According to the invention a shaft for the purpose specified has in combination an axial bore, splines or other driving means at one end for engagement with complementary means on one of the members, a part at said one end of the shaft for dog or like engagement with said one of the members, and a torsion bar in the bore in engagement with said part, the arrangement being such that, in use, the torsion bar will urge the part angularly in a direction opposite to that in which it is intended that the member should be driven through the splines or other driving means.

By way of example the invention will now be described with reference to the accompanying drawings, as applied to a shaft for transmitting a drive from a pinion adapted to be driven by an internal combustion engine to a coaxially disposed rotor of a fuel injection pump.

In the drawings—

FIGURE 1 is a part sectional side view of the example,

FIGURE 2 is a fragmentary section on the line 2—2 of FIGURE 1, and

FIGURES 3 and 4 respectively are a side view and an end view of a modified disc and torsion bar.

Referring to the drawings there is provided a hollow drive housing 1 which is secured by bolts 2 to the body 3 of a fuel injection pump. Rotatably mounted in the drive housing is a flanged sleeve 9ª to which is secured a pinion 9, and which is formed with an internally splined bore. Moreover the sleeve is retained in the drive housing by a thrust ring 4.

Also provided is a shaft 5 which has an axially disposed bore extending throughout its length and which is provided with external splines 7, 8, at its opposite ends respectively, these splines being adapted to engage with the internal splines on the flanged sleeve and further internal splines formed on the rotor 10 respectively.

Within the bore 6 at the end of the shaft engaged with the rotor 10, is a plug 11 having a projecting dog adapted to engage a complementary slot 12 in the rotor so as to prevent relative rotation. Moreover, in the inner end of the plug remote from the dog is a non-circular flared recess 13 in which is engaged the adjacent end of the torsion bar 14 of similar cross-section. The torsion rod extends through the bore to the opposite end of the shaft where it engages within a non-circular hole in a peripherally toothed disc 15 adapted to engage the splines of the sleeve 9ª.

In assembling the drive the following procedure is adopted, with the housing and body separated the toothed disc 15 together with the torsion bar 14 and the shaft 5 are first inserted in the flanged member, so that the splines on the disc and shaft engage with the splines on the flanged member and the toothed disc abuts against an abutment ring 16. Secondly the plug 11 is positioned with the dog in engagement with the slot 12 and then the housing and body are secured together during which process the splines 8 engage with the internal splines on the rotor 10. However before this engagement is effected the rotor is turned angularly to a position in which the flared recess is angularly misaligned with respect to the torsion bar so that as the engagement is effected the torsion bar will be twisted as its end enters the flared portion of the recess. As a result the co-operating splines of the shaft and the sleeve, and the splines on the shaft and the rotor will be resiliently urged in a direction to hold their driving flanks in engagement at all times.

Conveniently, both sets of splines are asymmetrical so that the shaft 5 can only be engaged with the rotor and the pinion at one angular disposition to ensure the correct timing relationship between the pump and the engine. Also the disc 15 is similarly formed and bears indicia indicating in which direction the torsion bar is to be stressed to accord with the direction of rotation of the engine.

In the modification shown in FIGURES 3 and 4 the disc 15ª is formed as an integral part of the torsion bar 14ª which is in the form of a strip having a head at one end. After blanking out the strip and head, the head 15ª is bent at right angles to the strip, and is initially shaped so as to provide the equivalent of at least one tooth for engagement with the splines of the sleeve 9ª.

Having thus described our invention what we claim as new and desire to secure by Letters Patent is:

Means for transmitting rotation from an internally splined hollow driving member to an internally splined hollow driven member, and comprising in combination a hollow shaft which is provided externally at one end with parts for slidable engagement with the internal splined portion of the driving member, and at the opposite end with parts for slidable engagement with the internal splined portion of the driven member, a torsion bar disposed throuhout the greater part of the length within said hollow shaft, a toothed member which is rigidly united with an end portion of said torsion bar and which extends from the first mentioned end of said hollow shaft, and which is engageable with the internal splined portion of the driving member, a plug member accommodated with said hollow shaft and in driving engagement at one end with said driven member, a recess formed in the opposite end of said plug member, said recess having a cross section complementary to the cross section of the other end portion of the torsion bar and with which it is angularly misaligned prior to the engagement of the driven member and shaft, said recess also having a flared entrance portion, whereby upon axial movement of the internal spline portion of the driven member and plug member with respect to the external parts on the end of said hollow shaft and said torsion bar during assembly, said other end of the torsion bar will be guided by the flared portion into the recess thereby stressing the torsion bar.

References Cited in the file of this patent

UNITED STATES PATENTS

| 1,695,343 | Pierce | Dec. 18, 1928 |
| 1,961,679 | Walti | June 5, 1934 |
| 2,822,677 | Reynolds | Feb. 11, 1958 |
| 3,020,775 | Musser | Feb. 13, 1962 |

FOREIGN PATENTS

| 691,281 | Great Britain | May 6, 1953 |